Oct. 28, 1958

M. J. FULTON ET AL 2,858,027

LIQUID DISPERSION SEPARATING DEVICE

Filed March 15, 1957

MERVIN J. FULTON
THOMAS J. FULTON
INVENTORS

BY

ATTORNEY

United States Patent Office 2,858,027
Patented Oct. 28, 1958

2,858,027

LIQUID DISPERSION SEPARATING DEVICE

Mervin J. Fulton and Thomas J. Fulton, Tulare Calif.; said Thomas J. Fulton assignor to Mervin J. Fulton Application March 15, 1957, Serial No. 646,251

12 Claims. (Cl. 210—450)

This invention relates to liquid dispersion separating devices, and more particularly to an improved filter cartridge featuring a more efficient and effective seal assembly between the cartridge proper and the enclosing housing therefor.

The subject matter of the present invention deals with the type of liquid-separating device disclosed in United States Letters Patent No. 2,649,964, granted to Charles S. Taylor on August 25, 1953, and to certain improvements for providing a combined anchorage and fluid-tight seal between one rim of the filter cartridge and the enclosing housing. Devices of the type therein referred to are employed to separate liquid and solid particles dispersed and suspended in other liquid desired in a state free of such foreign particles. The above designated Taylor patent provides a filter cartridge functioning satisfactorily as respects the separation of the undesirable foreign particles. The present invention provides an improved manner of supporting the filter cartridge within the operating environment housing and of forming a fluid seal between the cartridge and housing.

The problem presented will be appreciated better from the fact that cartridges of this type now in general use have a diameter of about two feet, a length of several feet and a weight of approximately 150 pounds. These replaceable units are removably encased centrally of a cylindrical housing permanently connected in circuit with other equipment. The filter cartridges are installed through the open end of the cylindrical housing, the outer end of the cartridge being spaced several feet inwardly of the open end. Owing to the necessity of employing a housing having a uniform internal diameter, it is necessary to provide a seal for the filter cartridge which can be expanded radially outward against the housing after installation and which is not subject to being damaged by the very considerable weight of the cartridge during insertion through the open end of the housing. Another problem not satisfactorily solved by prior designs is that of providing an effective and efficient seal which is not subject to cold flow and leakage on the upper half of the sealing ring caused by the cartridge weight acting on the lower half of the seal.

The present invention provides a cartridge having a combined anchorage and sealing assembly at its outer end obviating the various and series shortcomings of prior designs. These objectives are achieved by the use of a pair of cooperating rings adjustable axially of one another through the open end of the housing and so shaped on their juxtaposed rim surfaces upon being tightened as to force a sealing gasket radially outward into firm and uniform sealing engagement with the enclosing housing. Cooperating with these rings and the referred to sealing gasket are a plurality of radially adjustable supporting members which function to support a major portion of the cartridge weight thereby permitting of the uniform, distribution of radial stresses throughout the circumference of the sealing gasket as well as anchoring the cartridge firmly against displacement along the housing. The described arrangement prevents the unequal distribution of load on the gasket, the cold flow of the sealing material, and assures an effective and complete fluid seal between the cartridge and its housing throughout the life of the filter cartridge.

Accordingly, it is a primary object of this invention to provide a filter cartridge featuring an improved construction for supporting and sealing the same with respect to an enclosing housing.

Another object of the invention is the provision of a filter cartridge having a seal which is radially expansible into fluid-tight sealing engagement with a concentrically arranged enclosing housing.

Another object of the invention is the provision of a filter cartridge having a resilient seal together with adjustable means interposed between the filter and its housing and effective to relieve the sealing gasket from a major portion of the cartridge weight.

Another object of the invention is the provision of a readily replaceable filter cartridge having a combined anchorage and sealing gasket engageable with the interior of a cylindrical enclosing housing and cooperable therewith to hold the cartridge in a desired assembled relation and in a fluid-tight manner.

These and other more specific objects will appear upon reading the following specification and claims and upon considering in connection therewith the attached drawing to which they relate.

Referring now to the drawing in which a preferred embodiment of the invention is illustrated:

Figure 1:
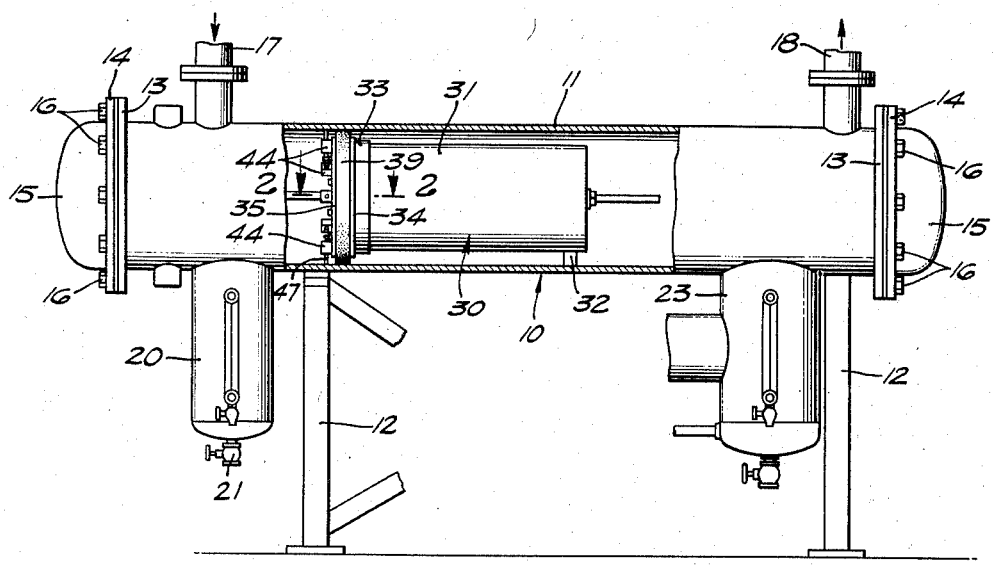
Figure 1 is an elevational view with parts broken away showing the filter cartridge of the present invention installed within an enclosing housing.

Referring to Figure 1, there is shown a separator designated generally 10 having a smooth bore cylindrical housing 11 suitably supported as upon pedestals 12, 12, the opposite ends of housing 11 being provided with radial flanges 13, 13 to which the flanged rims 14 of domed end caps 15 are detachably secured in fluid-tight manner as by cap screws 16. The inflowing contaminated liquid enters through a conduit 17 and the filtered fluid is exhausted through conduit 18. Heavier contaminants of the incoming liquid settle into a sump chamber 20 having a normally closed cleaning valve 21. A generally similar sump chamber 23 carried on the under side of housing near its outlet end serves a similar purpose. Inasmuch as the sump chambers per se form no part of the present invention, and are well known in the art, it will be unnecessary to describe them in greater detail.

The replaceable filter cartridge designated generally 30 comprises a generally cylindrical shell 31 appreciably smaller in diameter than separator housing 11 and open at its opposite ends. Suitably supported and arranged interiorly of shell 31 is filtering material such as excelsior, glass wool, granular solids, or the like, preferably so disposed as to produce a minimum pressure gradient between the opposite ends of the filter and maximum filtering effectiveness. Since the particular material and its arrangement within shell 31 forms no part of this invention and are well known to those skilled in the art, further description thereof will be unnecessary. However, it will be understood that preferred filtering materials and their arrangement within the shell are disclosed in the above referred to Taylor patent. The cartridge is designed for installation from the left-hand end of housing 11 as viewed in Figure 1 and its inner or forward end includes a supporting strut 32 the lower end of which may be rounded for convenience in sliding the filter unit along the inner surface of housing 11. Similar struts may extend radially from the opposite sides of the cartridge to assure centering thereof within the separator housing.

The outer end of the cartridge shell 31 is secured in any convenient manner to a collar 33 closely embracing the exterior of the shell and permanently assembled to a radial ring 34 as by welding 29. Cooperating with ring 34 is a similar ring 35 having a large diameter opening 36 in alignment with a similar opening 37 in ring 34.

Figure 2:
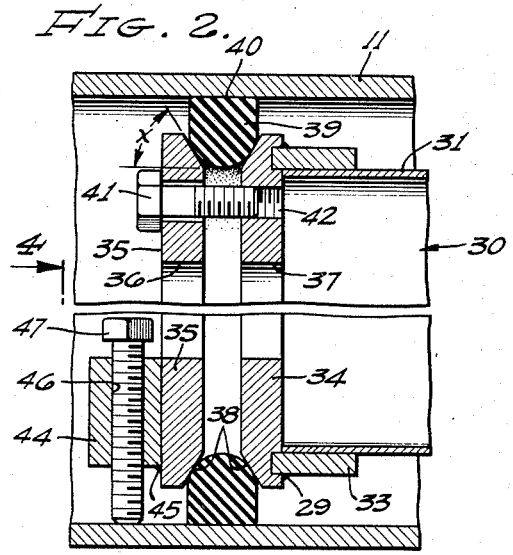
Figure 2 is an enlarged fragmentary view on an enlarged scale taken on the plane indicated by line 2—2 on Figure 1, the parts being properly positioned for expansion of the seal outwardly against the housing wall.

The juxtaposed corners of rings 34 and 35 are beveled at an angle preferably ranging between 55 and 60 degrees these bevels cooperating with one another to provide a flaring seat for a thick resilient gasket ring 39 having a relaxed configuration and size indicated in Figure 2. The outer peripheral edge 40 of the gasket is generally cylindrical and has a loose sliding fit with the interior surface of separator housing 11. Its inner periphery may be semi-circular in cross-section and makes annular contact with beveled surfaces 38 of clamping rings 34 and 35 when these rings are spaced apart as they are in Figure 2. These rings are axially adjustable relative to one another by means of a plurality of circumferentially distributed cap screws 41. These screws extend loosely through holes in the outer ring 35 and thread into threaded openings 42 in inner ring 34.

Figure 4:
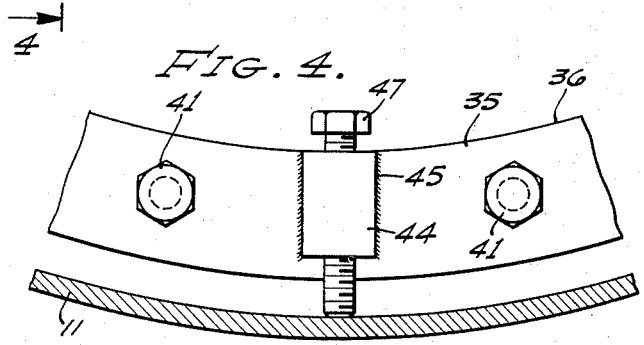
Figure 4 is a fragmentary view taken along line 4—4 on Figure 2 and showing details of the anchorage and weight-distributing features of the seal assembly.

As is made clear by Figures 2 and 4, outer ring 35 is provided on its outer face with a plurality of bosses 44 fixed thereto as by welding 45 and having radial threaded openings 46 seating cap screws 47. It will be understood that the heads of cap screws 47 project toward the cartridge axis and their outer ends are positioned to engage the housing wall in the installed position of the cartridge. By the proper adjustment of these cap screws it will be apparent that their outer ends can be used for multiple purposes as for example to support the outer end of the cartridge unit while it is being inserted or withdrawn from the separator housing, to center the same during the expansion of gasket 39, and thereafter as means securely anchoring the filter in place.

To install a new filter cartridge within the separator housing it is first necessary to remove cap screws 16 holding cover 15 in place at the left end of the separator as viewed in Figure 1. Skid 32 at the inner end of the cartridge is then placed in contact with the inner surface of housing 11 as the cartridge is slid inwardly to a desired operating position centrally of the housing. During this operation gasket rings 34 and 35 are spaced axially apart to the position illustrated in Figure 2 the gasket resting lightly against beveled edges 38 of these rings. Supporting cap screws 47 are so positioned as to support the outer end of the filter cartridge coaxially of shell 11 in order that the outer cylindrical surface 40 of gasket 39 will not be damaged as the cartridge is slid forwardly.

Figure 3:
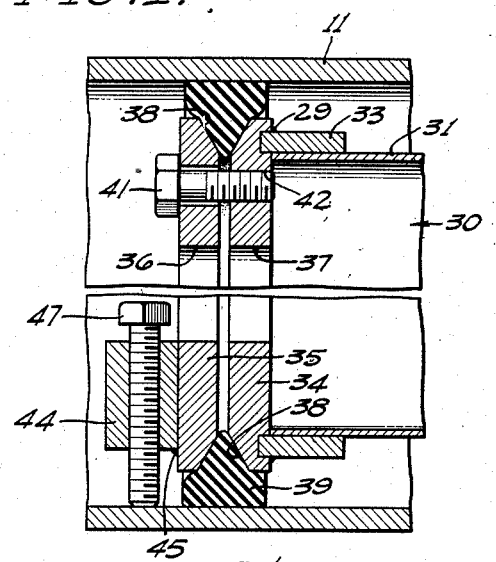
Figure 3 is a view similar to Figure 2 but showing the position of parts after the seal has been fully expanded against the housing.

Before proceeding to tighten cap screws 41 it is desirable to make certain that the axis of the cartridge is aligned with that of the separator housing. If the filter is not so positioned, the cap screws 47 are adjusted until this condition does obtain. Thereafter, cap screws 41 are tightened in equal increments forcing ring 35 axially toward ring 34 as beveled surfaces 38 cooperate with the rounded inner contour of gasket ring 39 forcing it radially outward into high pressure contact with the inner wall of separator housing 11. When the gasket is properly and fully tightened in this manner, the parts will occupy the positions indicated in Figure 3 wherein the cylindrical surface of the gasket is in uniform pressure contact with the housing surface and beveled surfaces 38 are in similar high pressure contact with the adjacent surfaces of the gasket ring.

It is emphasized that the weight of the filter cartridge not supported by the described equally distributed pressure forces acting on gasket ring 39 is carried by cap screws 47. For this reason there is no tendency for the resilient material of the gasket ring to cold flow out of contact with any of the essential sealing surfaces. Nor is there any tendency for the weight of the filter to compress the underlying half of the gasket thereby permitting leakage of unfiltered liquid past the upper half of the gasket. Further equal tightening of cap screws 47 serves to anchor the filter unit against movement within housing 11. Consequently vibrations, pressure surges or high pressure drops across the filter are ineffective to move the filter and impose a minimum strain on gasket 39, all of which advantages are of importance.

To replace a used cartridge with a new one it is merely necessary to again remove end cap 15, loosen set screws 47 sufficiently to permit sliding of the cartridge along the separator housing, and finally to loosen cap screws 41 allowing gasket 39 to contract out of pressure contact with the housing wall. Thereafter, the filter cartridge is withdrawn from the housing and a new one is installed in the same manner described above.

While the particular filter cartridge herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. In a separator of the type having a cylindrical housing with fluid flow passages at its opposite ends and a replaceable filter cartridge supported therebetween, that improvement which comprises a sealing gasket assembly carried by one end of said filter cartridge, said assembly including a pair of axially movable rigid members having outwardly flaring corners at their facing rim edges, a continuous resilient gasket ring supported by said flaring corners and adapted to be radially expanded thereby as said rigid members are moved toward one another, and means for drawing said members together to expand said gasket outwardly into fluid tight sealing engagement with said separator housing.

2. A separator as defined in claim 1 including adjustable means carried by one of said rigid members for rigidly anchoring said cartridge and expanded gasket against movement relative to the separator housing.

3. A separator as defined in claim 1 wherein said pair of rigid members comprises a pair of rings having large area flow passages therethrough, the outer one of said rings having a plurality of set screws supported therein for adjustment radially of the ring and cooperable with the interior surface of a separator housing to center the filter cartridge within the housing before adjusting said ring members to expand said sealing gasket.

4. A replaceable filter cartridge having a mounting assembly supported on one end thereof for supporting the same in fluid-tight engagement concentrically of an enclosing housing, said assembly including a pair of rigid ring members relatively movable axially of one another, said ring members having outwardly flaring opposed rim edges seating thereon a thick gasket ring, and means for drawing said rings and flaring edges axially together to expand said gasket radially outward to seal said filter with respect to the walls of a surrounding housing therefor.

5. A replaceable filter cartridge as defined in claim 4 wherein one of said ring members includes a radially adjustable anchor member projecting beyond the outer rim of said ring and serving to center said cartridge within a housing for said cartridge to protect the sealing gasket during the installation of the cartridge.

6. A replaceable filter cartridge as defined in claim 4 wherein said sealing gasket has a generally cylindrical exterior peripheral surface and a converging interior peripheral surface adapted to seat on the outwardly flaring rim edges of said ring members.

7. A replaceable filter cartridge provided with attached means for securing the same between the ends of an enclosing housing, said cartridge having means mounted on one end thereof supporting a sealing gasket having an exposed rim edge, and means operable from the end of the cartridge for expanding said gasket radially to provide a fluid-tight seal with an enclosing housing after the filter cartridge has been installed therein.

8. A replaceable filter cartridge as defined in claim 7 wherein said cartridge is provided with radially adjustable members adjacent said sealing gasket having ends projecting at least as far as the outer peripheral surface of the gasket and engageable with the interior wall of a filter housing and effective to prevent damage to the filter during insert into the housing.

9. A replaceable filter cartridge having a radially expansible gasket encircling the body thereof, and having an outer diameter before installation approximately the same as the internal diameter of the housing for which it is designed, means for expanding said gasket into fluid-tight sealing engagement with a housing after insertion therein, and means for anchoring the filter to the housing after said gasket has been expanded.

10. A replaceable filter cartridge for insertion in a housing forming part of a fluid circuit, gasket means carried by said filter and expandable after insertion of the cartridge into a housing to provide a fluid-tight seal between the housing and the cartridge, and means for holding said cartridge centered within the housing during insertion of the cartridge to safeguard said gasket from damage.

11. A replaceable filter cartridge as defined in claim 10 wherein said cartridge centering means is adjustable inwardly and outwardly relative to the interior of the filter housing.

12. A replaceable filter cartridge as defined in claim 10 wherein said cartridge centering means is adjustable into locking engagement with the filter housing following expansion of said gasket thereby anchoring the cartridge and holding the same accurately centered.

References Cited in the file of this patent

UNITED STATES PATENTS

| | | |
|---|---|---|
| 795,444 | Kales | July 25, 1905 |
| 1,177,338 | Kayfetz | Mar. 28, 1916 |
| 1,215,510 | Engstrom | Feb. 13, 1917 |
| 1,366,075 | Heeter | Jan. 18, 1921 |
| 1,496,536 | Heyen | June 3, 1924 |
| 1,568,269 | Cormier | Jan. 5, 1926 |
| 2,649,964 | Taylor | Aug. 25, 1953 |

FOREIGN PATENTS

| | | |
|---|---|---|
| 201,409 | Germany | Sept. 15, 1908 |